A. YELIN & J. O. HOUSER.
FITTING PLATFORM FOR LADIES' GARMENTS.
APPLICATION FILED AUG. 15, 1912.

1,131,101.

Patented Mar. 9, 1915.
3 SHEETS—SHEET 1.

WITNESSES:
Robert N. Cundall
Walter A. Kelley

INVENTORS
Adolph Yelin and
John O. Houser
BY J. Wm. Ellis
ATTORNEY.

A. YELIN & J. O. HOUSER.
FITTING PLATFORM FOR LADIES' GARMENTS.
APPLICATION FILED AUG. 15, 1912.

1,131,101.

Patented Mar. 9, 1915.
3 SHEETS—SHEET 2.

WITNESSES:
Robert N. Cundall
Walter H. Kelley

INVENTORS
Adolph Yelin and
John O. Houser
BY
J. W. Ellis
ATTORNEY.

A. YELIN & J. O. HOUSER.
FITTING PLATFORM FOR LADIES' GARMENTS.
APPLICATION FILED AUG. 15, 1912.

1,131,101.

Patented Mar. 9, 1915.
3 SHEETS—SHEET 3.

WITNESSES:
Robert N. Cundall
Walter H. Kelley

INVENTORS
Adolph Yelin and
John O. Houser
BY
J. W. Ellis
ATTORNEY.

UNITED STATES PATENT OFFICE.

ADOLPH YELIN AND JOHN O. HOUSER, OF BUFFALO, NEW YORK.

FITTING-PLATFORM FOR LADIES' GARMENTS.

1,131,101.   Specification of Letters Patent.   Patented Mar. 9, 1915.

Application filed August 15, 1912. Serial No. 715,243.

*To all whom it may concern:*

Be it known that we, ADOLPH YELIN and JOHN O. HOUSER, citizens of the United States of America, and residents of the city of Buffalo, county of Erie, and State of New York, have invented a Fitting-Platform for Ladies' Garments, of which the following is a full, clear, and exact description.

Our invention is one which may be employed by ladies' tailors for fitting garments to ladies, and particularly for measuring the length of ladies' skirts, dresses and coats.

In producing our invention we have sought to provide a simple, easily operated and accurately adjustable device for accomplishing the general object stated in the last paragraph.

As is well known, ladies' tailors have experienced much difficulty in accurately measuring the length of dresses, skirts and coats, on account of the awkward and difficult manner in which such measurements have had to be made, with either the aid of only imperfect devices for accomplishing this purpose or entirely by hand, the result being that in most cases accurate measurements cannot be obtained without the expenditure of a great deal of time and effort and frequently many alterations are made necessary.

To overcome these difficulties and provide a means which will accurately and quickly measure and mark the length of garments, such as above referred to, we have provided the invention shown in the accompanying drawings and hereinafter described.

Many other advantages than those hereinbefore referred to will be evident to those skilled in the art, after a consideration of the device which is herein illustrated and described.

Figure 1:
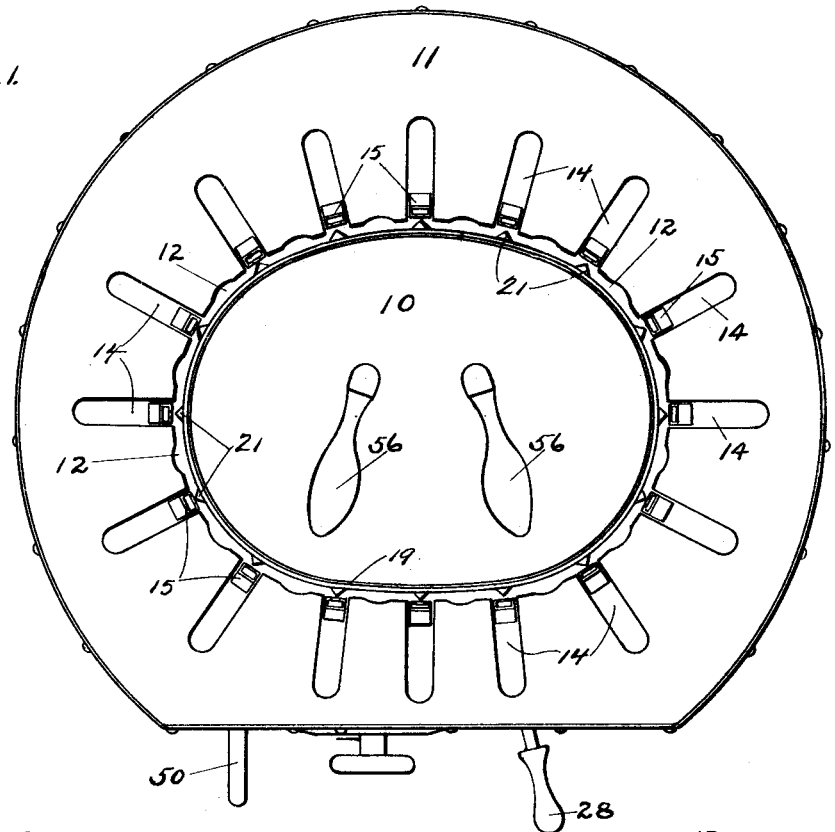
Figure 2:
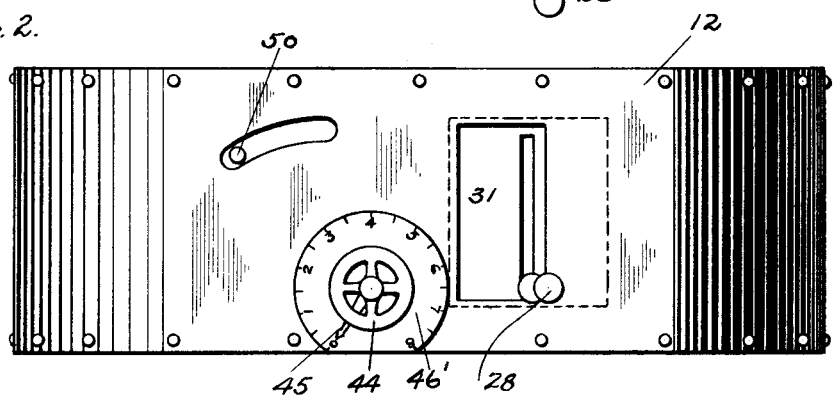
Figure 3:
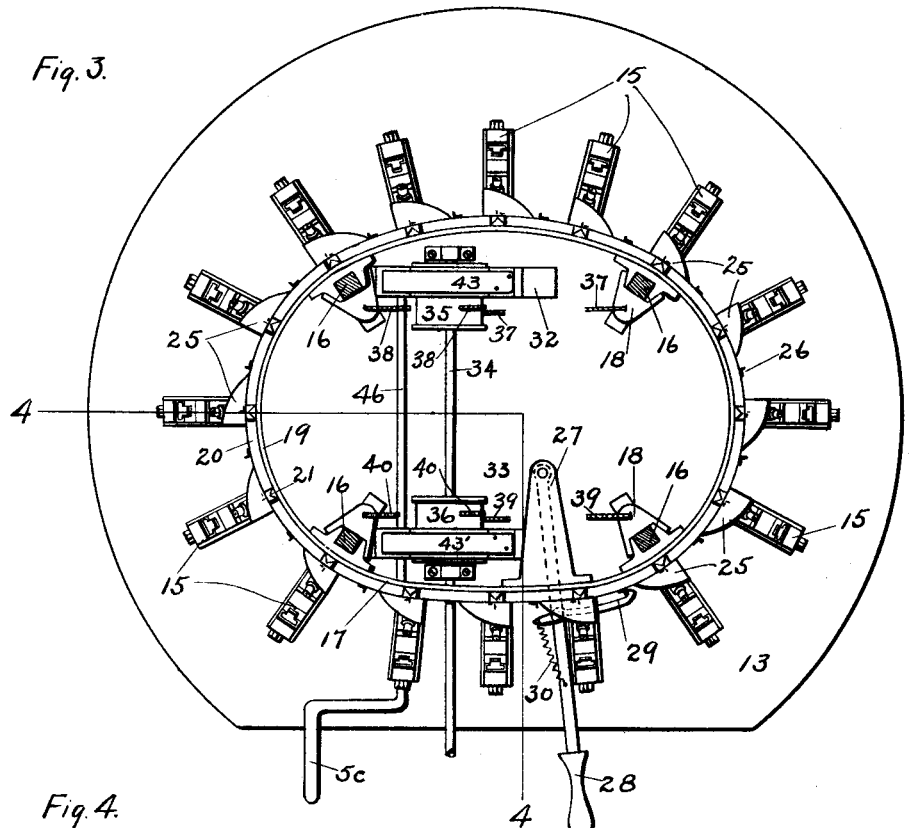
Figure 4:
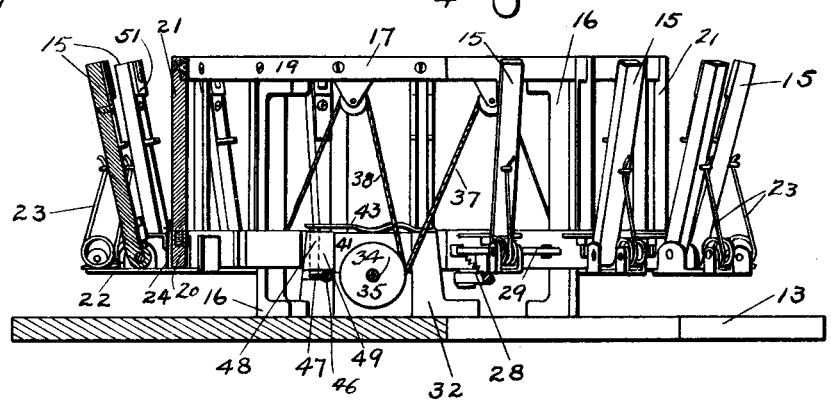
Figure 5:
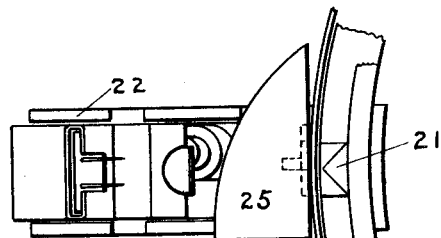
Figure 7:
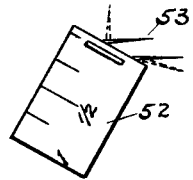
Figure 6:
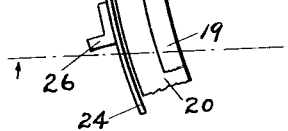
Figure 6:
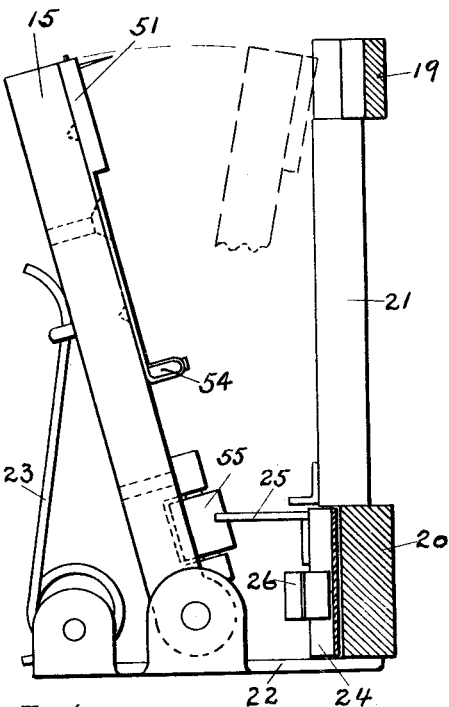
Figure 8:
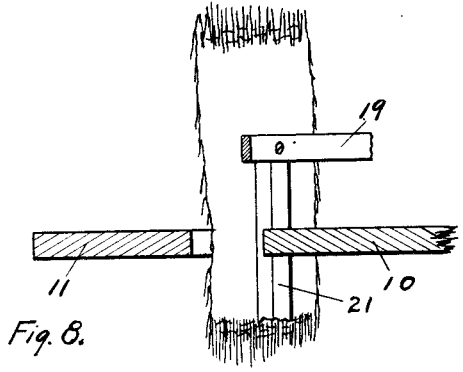
Figure 9:
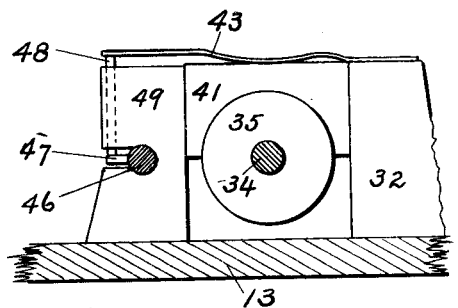

Referring now to the drawings: Figure 1 is a top plan view of our invention. Fig. 2 is a front elevation of the same. Fig. 3 is a plan view of the invention with the platform, side walls and surrounding table removed. Fig. 4 is a view partly in section and partly in elevation, the section being taken on line 4—4 of Fig. 3. Fig. 5 is an enlarged detail view of a part of the hammer operating mechanism. Fig. 6 is an enlarged detail view of one of our hammers shown in full lines in position ready to strike and mark and indicating in dotted lines its normal position. Fig. 7 is an enlarged detail view of one of the tabs designed to be secured to the garment by the hammers. Fig. 8 is an enlarged detail view showing the position of a part of a garment while being fitted and measured in our device. Fig. 9 is an enlarged detail of the brake actuating mechanism.

Our invention comprises a platform 10 and a surrounding table 11, underneath which the operating part of our mechanism is placed. The table 11 is supported by suitable side walls 12 above a base 13.

One of the important characteristics of our invention is that the platform 10 has a contour which corresponds to the contour of the hips of a lady's figure. Between the platform 10 and the surrounding table 11, there is provided an open space 12 through which the loose ends of the garment being fitted may be placed, while the fitting and measuring operations proceed, thus allowing the fabric to fall evenly and normally about the person being fitted. The radiating spaces 14 in the table 11 are provided so as to allow room for the operation of the hammers 15. Suitably secured to the base 13 are standards 16 and these standards are connected by any suitable frame work. A carriage 17 (Fig. 4) has inside guide pieces 18 which are guided in their vertical travel by the standards 16 which support the platform 10. The carriage 17 also has an upper band 19 and a lower band 20. Braces 21 connect the two bands 19 and 20 and are suitably secured thereto. The upper ends of the braces 21 preferably have a V-shaped outline for a purpose to be hereinafter described. The lower band 20 carries supports 22 on which are pivotally mounted the lower ends of the hammers 15. Also carried by the supports 22 are springs 23 which normally keep the upper ends of the hammers in contact with the V-shaped upper ends of the braces 21. Surrounding the exterior of the band 20 is another band 24 which is preferably made of thin steel on which are fastened a plurality of cam shaped spacers 25. The number of the spacers 25 corresponds to the number of the hammers 15. When our invention is normally not in use, these spacers 25 rest between each pair of hammers. When the carriage 17 is raised by the means to be hereinafter described and the device is prepared for measuring and marking the garment, these spacers are moved between the band 20 and the hammers 15, thus throwing the heads of the hammers 15 away from the V-shaped tops of the braces 21 against the tension of the springs 23.

The band 24 carries midway between each pair of spacers 25 a plurality of catches 26. Secured inside of the band 20 is a support 27 on which is pivotally mounted a hand lever 28. Pivotally carried by the lever 28 is a pawl 29 which engages with one of the catches 26 and is preferably normally held in engagement therewith by a spring 30. The lever 28 projects through the front side wall 12 of the machine. This lever can be thrown from right to left and when thrown (the pawl 29 being, as stated, normally in engagement with one of the catches 26) will revolve the band 24, thus carrying with it the spacers 25 and thereby throwing the upper ends of the hammers 15 away from the braces 21. In order to keep the interior mechanism free from dust and dirt we preferably provide a sliding plate 31 (Fig. 2) over the space traveled by the side throw of the lever 28.

To the base 13 are secured bearings 32 and 33 in which is mounted a revolving shaft 34. Carried by this shaft are drums 35 and 36 to each of which one end of two of the four cords or chains 37, 38, 39 and 40 are secured. Around one end of each of the drums, the cords are adapted to wind and unwind and bearing down upon the other end of each of these drums is a friction block 41 and 42, each of which is normally held in engagement with its drum by the springs 43, 43'. Each of the cords or chains 37, 38, 39 and 40, has, as stated, one of its ends secured to one of the drums 35 and 36, then passed over pulleys secured to the bottom of platform 10 and its other end secured in any suitable way to the bottom of the carriage 17, preferably at its corners. Secured to the outside end of the shaft 34 is a hand wheel 44 which carries an indicator hand 45. The hand 45 is placed in front of a dial 46' which is spaced off to represent inches and fractions thereof and it indicates the extent of the vertical travel of the carriage 17. In the bearings, 32 and 33 is journaled a second shaft 46. Keyed in this shaft immediately under each of the springs 43, 43' are pins 47 which are always in contact with sliding pins 48, the latter being suitably carried in housings 49 mounted on the bearings 32 and 33. On the outer end of the shaft 46 is a handle 50 which, when revolved, throws the pins 47 so that they will raise the pins 48 and thereby lift the springs 43 43' away from the friction blocks 41, thus releasing the drums 35 and 36 and allowing the cords or chains 37, 38, 39 and 40 to unwind from their respective drums. These friction blocks act as brakes and when released as described, they permit the carriage, if it has been previously elevated, to drop to its lowermost position.

To the upper ends of the hammers 15 are secured a series of tag holders or markers 51. Evidently many different forms of such markers may be used, but preferably we have shown in the drawings double headed markers which are revolubly mounted on the hammers 15. In Fig. 6, we have shown the upper end of the marker 51 supplied with a tag 52 having protruding pin points 53 (Fig. 7). This end of each marker is preferably provided with a recess into which the pin-carrying tags are disposed and whereby they are held until attached by the hammers to the garments being fitted. The lower end of the marker has a right angled projection 54 which is preferably provided with some means of holding a fabric or chalk carrier. To the fabric held by the part 54 chalk may be applied. If the markers 51 are revolved so that the ends holding the tags 52 are uppermost, then when the hammers are thrown in contact with the fabric hanging between them and the braces 21, the pin points of the tags will pierce the fabric and then be pressed apart by the V-shaped tops of the braces and thus the tags will be securely attached to the fabric. If the ends carrying the chalk fabric 54 of the markers 51 are uppermost, then when the hammers 15 are thrown against the fabric hanging between the hammer heads and the braces 21, a plurality of chalk marks will be made upon the garment being fitted.

We preferably provide rollers 55 on the lower ends of each of the hammers in such a position that when the spacers 25 are thrown in contact with them the friction thereby produced will be greatly minimized.

Having thus described the several parts of our invention we will now describe its operation: The lady being fitted stands in the position on the platform 10 indicated by the footprints 56 (Fig. 1). The garment being fitted is at this stage of the fitting usually several inches longer than after it is fitted, such additional length being provided for the lower hem of the garment. The lever 28 is first thrown from right to left so that the spacers 25 force the hammers 15 back from the braces 21 and leave between the carriage 17 and the upper ends of the hammers a clear space. In this space the lower edge of the garment being fitted is allowed to fall. The carriage 17 is then raised by operating the hand wheel 44 until the upper ends of the braces 21 are at the desired distance above the platform 10. This distance is determined by the desired length of the garment being fitted and depends upon the wish of the wearer as to whether the garment, after it is made, shall be an inch or more or less from the ground. This distance is accurately indicated by the indicator hand 45 and dial plate 46 in front of the machine.

If the garment being fitted is of black material the markers 51 are preferably revolved so that the chalk carrying ends are at the upper ends of the hammers. If the garment being fitted is white or other light material, the markers 51 are preferably revolved so that the ends carrying the pin pointed tags are at the upper ends of the hammers 15.

The desired length of the garment having been determined and the adjustments having been made as described, the lever 28 is again thrown from right to left, thus carrying the spacers 25 from between the hammers 15 and the band 19, and allowing the upper ends of the hammers to be thrown forward by the action of the springs 23. The forward throw of the hammers 15 makes either a plurality of chalk marks or fastens a plurality of tags around the circumference of the garment being fitted which accurately determine the length of the finished garment. This operation is performed instantaneously and the marking and measurement is absolutely exact and accurate throughout the circumference of the lower edge of the garment. The hammer heads are now again thrown back so as to release the fabric and the carriage dropped, by the means described, to its lowermost position, the measurement being completed.

Pin-carrying tags are preferably provided with graduations, or scale marks, so that after being secured to the garment, the tailor may easily and conveniently make the front of the garment longer than the back, or vice versa, or, in any other way, uniformly alter the length of the garment anywhere throughout its bottom circumference without having to use a tape line, or other measuring device.

By means of this simple mechanism a great deal of labor and time is saved and perfect results in determining the length of garments are attained.

Obviously many modifications of the details herein shown and described may be made without departing from the spirit of our invention or the scope of the appended claims, and we do not wish to be limited to the exact embodiment herein shown and described.

Having thus described our invention, what we claim is:

1. A device of the character described comprising a platform, a vertically movable carriage surrounding said platform, a plurality of hammers pivotally carried by said carriage, means for simultaneously moving the upper ends of said hammers away from said carriage and means for simultaneously forcing the upper ends of said hammers against said carriage.

2. A device of the character described comprising a platform, a vertically movable carriage surrounding said platform, a plurality of simultaneously operated hammers pivotally carried by and engaging with said carriage and marking means carried by the upper ends of said hammers.

3. A device of the character described comprising a platform, a vertically movable carriage surrounding said platform, a plurality of hammers pivotally carried by said carriage, marking means carried by the upper ends of said hammers, means for simultaneously moving the upper ends of said hammers away from said carriage and means for simultaneously forcing the upper ends of said hammers against said carriage.

4. A device of the character described comprising a platform, a vertically movable carriage surrounding said platform, said carriage comprising an upper band, a lower band and a plurality of vertical braces, a plurality of simultaneously operated hammers pivotally carried by said carriage and means for simultaneously forcing the upper ends of said hammers against the upper ends of said braces.

5. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, a second band revolubly mounted around said lower band and cam shaped spacers secured to said second revoluble band between each pair of said hammers.

6. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, a second band revolubly mounted around said lower band, cam shaped spacers secured to said second revoluble band between each pair of said hammers, and means for revolving said second band.

7. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, a second band revolubly mounted around said lower band, cam shaped spacers secured to said second revoluble band between each pair of said hammers, catches secured to said second band between each pair of said spacers and lever means for engaging said catches and revolving said second band.

8. A device of the character described comprising a platform, a vertically movable carriage surrounding said platform, a plurality of hammers pivotally carried by and engaging with said carriage and pivotally mounted marking means carried by the upper ends of said hammers.

9. A device of the character described comprising a platform, a vertically movable carriage, a plurality of hammers pivotally carried by said carriage, means for forcing the upper ends of said hammers away from said carriage, means for normally holding the upper ends of said hammers against said carriage and pivotally mounted marking means carried by the upper ends of said hammers, one end of said marking means being provided with a chalk marker and the other end thereof being provided with a tag carrier.

10. A device of the character described comprising a platform, a vertically movable carriage surrounding said platform, said carriage comprising an upper band, a lower band and a plurality of vertical braces, a plurality of hammers pivotally carried by said carriage, means for simultaneously forcing the upper ends of said hammers against the upper ends of said braces and means for simultaneously moving the upper ends of said hammers away from the upper ends of said braces and thereby providing a space between said braces and the upper ends of said hammers in which the lower edge of a garment may hang.

11. A device of the character described comprising a platform, a vertically movable carriage surrounding said platform, said carriage comprising an upper band, a lower band and a plurality of vertical braces, a plurality of hammers pivotally carried by said carriage, means for simultaneously forcing the upper ends of said hammers against the upper ends of said braces and marking means carried by the upper ends of said hammers.

12. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, means for forcing the upper ends of said hammers away from the upper ends of said braces and thereby providing a space between said braces and the upper ends of said hammers in which the lower edge of a garment may hang, and marking means carried by the upper ends of said hammers.

13. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, means for forcing the upper ends of said hammers away from the upper ends of said braces and thereby providing a space between said braces and the upper ends of said hammers in which the lower edge of a garment may hang and marking means carried by the upper ends of said hammers, said marking means comprising a tag carrier, whereby when the upper ends of said hammers are thrown against the upper ends of said braces a plurality of tags are secured to the hanging garment.

14. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, means for forcing the upper ends of said hammers away from the upper ends of said braces, and thereby providing a space between said braces and the upper ends of said hammers in which the lower edge of a garment may hang, and marking means carried by the upper ends of said hammers, said marking means comprising a chalk marker whereby when the upper ends of said hammers are thrown against the upper ends of said braces a plurality of chalk marks are made around the circumference of the hanging garment.

15. A device of the character described comprising a platform, a vertically movable carriage surrounding said platform, said carriage comprising an upper band, a lower band and a plurality of vertical braces, a plurality of hammers pivotally carried by said carriage, means for normally holding the upper ends of said hammers against the upper ends of said braces, means for forcing the upper ends of said hammers away from the upper ends of said braces and thereby providing a space between said braces and the upper ends of said hammers in which the lower edge of a garment may hang and pivotally mounted marking means carried by the upper ends of said hammers, said marking means comprising a tag carrier and a chalk marker.

16. A device of the character described comprising a platform, a base, standards carried by said base, a carriage vertically movable around said platform on said standards, a shaft revolubly mounted in bearings carried by said base, drums mounted on said shaft, flexible connections secured to said drums and said carriage, means for actuating said shaft and thereby elevating said carriage and brake means for holding said carriage in any desired elevated position.

17. A device of the character described comprising a platform, a base, standards carried by said base, a carriage vertically movable around said platform on said standards, a shaft revolubly mounted in bearings carried by said base, drums mounted on said shaft, flexible connections secured to said drums and said carriage, means for actuating said shaft and thereby elevating said carriage, brake means for holding said carriage in any desired elevated position and means for disengaging said brake means and allowing said carriage to drop to its lowermost position.

In testimony whereof we have hereunto signed our names in the presence of two subscribing witnesses.

ADOLPH YELIN.
JOHN O. HOUSER.

Witnesses:
J. Wm. Ellis,
Charles B. Moulthrop.

Copies of this patent may be obtained for five cents each, by addressing the "Commissioner of Patents, Washington, D. C."